United States Patent [19]

Shimada et al.

[11] Patent Number: 5,621,424
[45] Date of Patent: Apr. 15, 1997

[54] HEAD MOUNT DISPLAY APPARATUS ALLOWING EASY SWITCHING OPERATION FROM ELECTRONIC IMAGE TO EXTERNAL FIELD IMAGE

[75] Inventors: Naoto Shimada; Toshiro Okamura; Seiichiro Tabata; Satoshi Imai; Osamu Konuma; Koh Mohri; Yuki Tokuhashi, all of Tokyo, Japan

[73] Assignee: Olympus Optical Co., Ltd., Tokyo, Japan

[21] Appl. No.: 390,821

[22] Filed: Feb. 16, 1995

Related U.S. Application Data

[63] Continuation of Ser. No. 100,970, Aug. 3, 1993, abandoned.

[30] Foreign Application Priority Data

Aug. 24, 1992 [JP] Japan .................................. 4-224012
Oct. 6, 1992 [JP] Japan .................................. 4-267503

[51] Int. Cl.⁶ .................................................. G09G 5/00
[52] U.S. Cl. .................................................. 345/8; 348/56
[58] Field of Search .......................... 345/7, 8, 9; 359/13, 359/630, 631, 632, 633; 2/8, 15, 12, 13, 410; 358/88, 92; 348/51, 52, 53, 56, 55

[56] References Cited

U.S. PATENT DOCUMENTS

| | | | |
|---|---|---|---|
| 4,190,856 | 2/1980 | Ricks | 358/88 |
| 4,241,286 | 12/1980 | Gordon | 2/8 |
| 4,347,508 | 8/1982 | Spooner | 340/980 |
| 4,948,232 | 8/1990 | Lange | 345/89 |
| 4,988,183 | 1/1991 | Kasahara | 351/210 |
| 5,281,957 | 1/1994 | Schoolman | 345/8 |

FOREIGN PATENT DOCUMENTS

| | | |
|---|---|---|
| 4-23582 | 1/1992 | Japan . |
| 86/01963 | 3/1986 | WIPO . |

*Primary Examiner*—Chanh Nguyen
*Attorney, Agent, or Firm*—Frishauf, Holtz, Goodman, Langer & Chick

[57] ABSTRACT

A display apparatus, which can be mounted on the head portion of a man, includes a two-dimensional display unit for displaying an image. A projection optical system projects the image displayed on the two-dimensional display unit onto the retina of the eyeball of a user. A shutter is arranged in front of the eyeball of the user. A detector detects at least a forward inclination of motions of the head portion of the user. A control unit controls the shutter in accordance with the output from the detector to switch the shutter between a light transmission state and a light shielding state. A housing incorporates and holds the two-dimensional display unit, the projection optical system, the shutter, and the detector to be mountable on the head portion of the user.

17 Claims, 10 Drawing Sheets

HEAD MOUNT DISPLAY APPARATUS ALLOWING EASY SWITCHING OPERATION FROM ELECTRONIC IMAGE TO EXTERNAL FIELD IMAGE

This application is a continuation of application Ser. No. 08/100,970, filed Aug. 3, 1993, now abandoned.

BACKGROUND OF THE INVENTION

1. Field of the Invention

The present invention relates to a head-mount display apparatus capable of allowing an observer to observe an image in a state wherein the apparatus is attached to a head portion of the observer.

2. Description of the Related Art

As a conventional head-mount display apparatus capable of allowing an observer to observe an image in a state wherein the apparatus is attached to a head portion of the observer, Published Unexamined Japanese Patent Application No. 4-23582 is known. This apparatus has the following arrangement. That is, in an image display apparatus, an apparatus main body includes a light source and a liquid crystal panel illuminated with light emitted from the light source, and the apparatus main body is attached onto the head portion of a user to project an image on the liquid crystal panel onto his or her eyeballs. In this apparatus, a mounting means is attached to the apparatus main body, and when the mounting means is flipped up, at least one of an image on the liquid crystal panel and a voice is turned off.

In Published Unexamined Japanese Patent Application No. 4-23582 described above, when the head-mount display apparatus is mounted, since it covers both the eyes of a user, the user cannot perceive an environment around him or her in this state. In particular, since a user cannot perceive a key input operation with his or her hand or an environment around his or her feet upon movement, he or she must flip up a display to see a corresponding portion every time he or she wants to do so.

SUMMARY OF THE INVENTION

It is, therefore, an object of the present invention to provide a head-mount display apparatus, which can easily switch a displayed image from an electronic image to an external field image when a user who wears the head-mount display apparatus wants to do an operation with his or her hand, or to see an environment around his or her hand, or to see a state at his or her feet in a standing position.

In order to achieve the above object, according to the first aspect of the present invention, a display apparatus which can be mounted on a head portion of a man, comprising:

two-dimensional display means for displaying an image;

a projection optical system for projecting the image displayed on the two-dimensional display means onto a retina of an eyeball of a user;

shutter means arranged in front of the eyeball of the user;

detection means for detecting at least a forward inclination of motions of the head portion of the user;

control means for controlling the shutter means in accordance with an output signal from the detection means, and switching between a light transmission state and a light-shielding state of the shutter means; and a housing, which incorporates and holds the two-dimensional display means, the projection optical system, the shutter means, and the detection means so as to be mountable on the head portion of the user.

In order to achieve the above object, according to the second aspect of the present invention, a display apparatus which can be mounted on a head portion of a man, comprising:

two-dimensional display means for displaying an image;

a projection optical system for projecting the image displayed on the two-dimensional display means onto a retina of an eyeball of a user;

shutter means arranged in front of the eyeball of the user;

visual axis detection means for detecting a visual axis direction of the user;

control means for controlling the shutter means in accordance with an output signal from the visual axis detection means, and switching between a light transmission state and a light-shielding state of the shutter means; and a housing, which incorporates and holds the two-dimensional display means, the projection optical system, the shutter means, and the visual axis detection means so as to be mountable on the head portion of the user, wherein the control means switches the shutter means to the light transmission state in response to an output signal obtained from the visual axis detection means when the user turns his or her face downward.

In order to achieve the above object, according to the third aspect of the present invention, a display apparatus which can be mounted on a head portion of a man, comprising:

two-dimensional display means for displaying an image;

a projection optical system for projecting the image displayed on the two-dimensional display means onto a retina of an eyeball of a user;

detection means for projecting light onto the eyeball of the user, and detecting a visual axis direction of the eyeball of the user or a blink of the eyeball of the user upon reception of the light reflected by the eyeball; and optical path synthesizing means for synthesizing an optical path of the projection optical system, and an optical path of light projected from the detection means.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

The preferred embodiments of the present invention will be described hereinafter with reference to the accompanying drawings.

A head-mount display apparatus of this embodiment detects a user's motion for watching an external field image at his or her hand or feet, and controls to switch an image between an electronic image and an external field image in synchronism with the detected motion.

Figure 2:
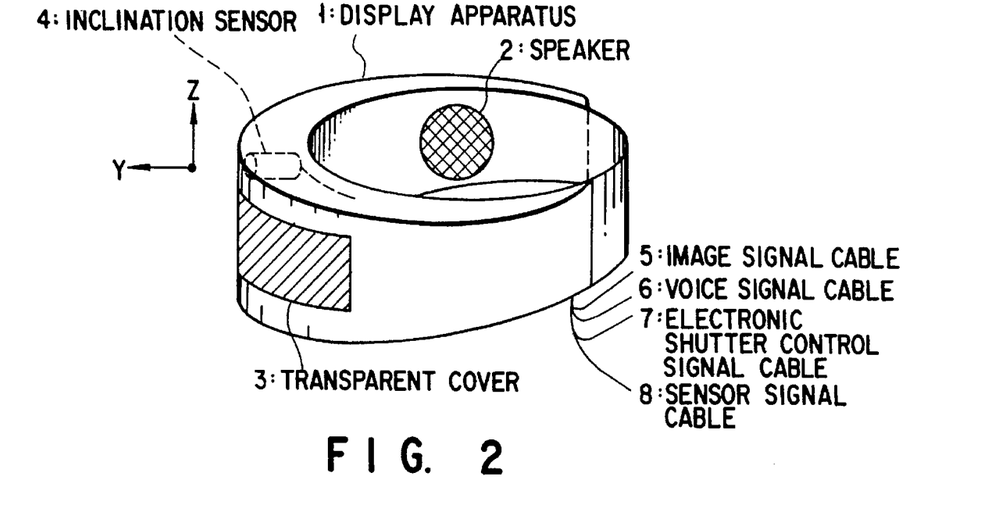
FIG. 2 is a perspective view showing an outer appearance of the head-mount display apparatus according to the first embodiment.

FIG. 2 is a perspective view showing the outer appearance of a head-mount display apparatus according to the first embodiment.

The outer appearance of a display apparatus 1 is designed to have a shape mountable on a head portion, and is connected to a control apparatus (not shown) via an image signal cable 5, a voice signal cable 6, an electronic shutter control signal cable 7, and a sensor signal cable 8.

The sensor signal cable 8 is used for outputting a signal from an inclination sensor 4, which is arranged in the display apparatus, and detects the inclination of the head portion of a user who wears the display apparatus 1.

The inclination sensor 4 adopts two piezoelectric type acceleration pickups, which are arranged to detect vectors in the Y-axis direction (the back-and-forth direction of the user) and the Z-axis direction (up-and-down direction of the head of the user), and can detect the forward inclination of the head portion of the user on the basis of the outputs from these two pickups.

A transparent or semi-transparent cover 3 is arranged on the front surface of the display apparatus, and an electronic shutter (13 in FIGS. 3A and 3B) for switching an image between an electronic image and an external field image is arranged behind the cover 3.

Figure 3A:
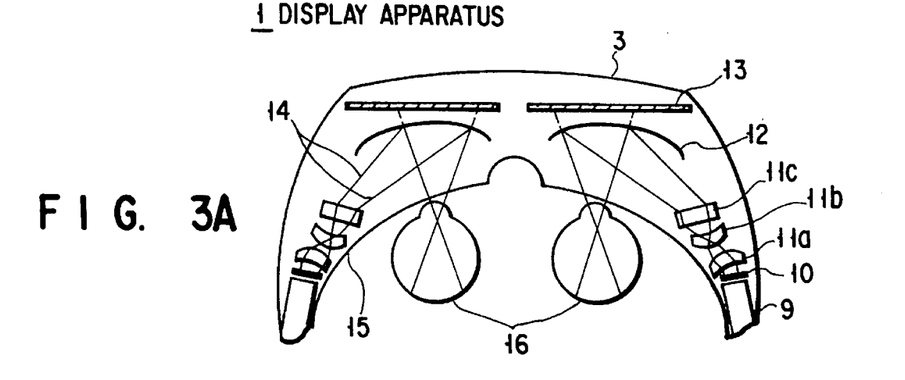
FIGS. 3A and 3B are respectively a schematic plan view and a schematic side view of the display apparatus including an optical system according to the first embodiment.
Figure 3B:
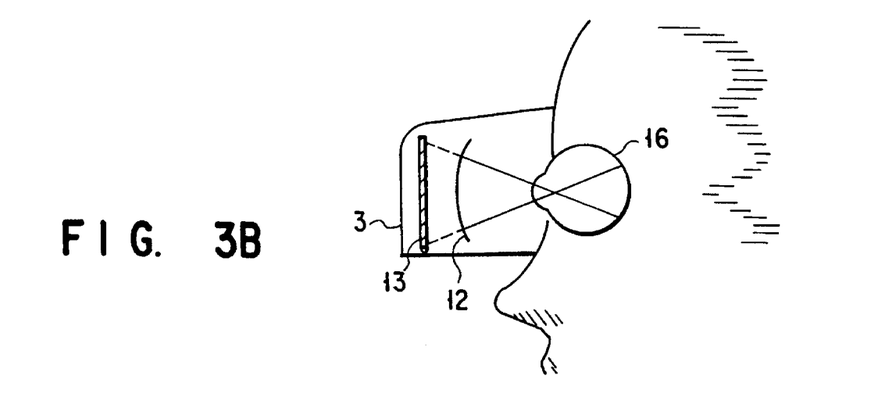

FIGS. 3A and 3B show an optical system of this embodiment. FIG. 3A is a schematic plan view of the optical system, and FIG. 3B is a side view of the optical system.

Referring to FIGS. 3A and 3B, the display apparatus 1 is mounted on the head portion, and is in tight contact with a face 15. A pair of optical systems for the right and left eyes are arranged in the display apparatus.

A liquid crystal illumination device 9 is arranged inside the side surface of the display apparatus 1, and a liquid crystal plate 10 is arranged just in front of the illumination device 9. Aberration correction lenses 11a, 11b, and 11c are arranged in front of the liquid crystal plate 10. A concave half mirror 12 and a liquid crystal plate type electronic shutter 13 are arranged in front of each eyeball 16.

The liquid crystal plate 10 is driven by an image signal, and an image is displayed on the liquid crystal plate 10. Furthermore, white light emitted from the illumination device 9 is transmitted through the liquid crystal plate 10. The transmission light is reflected by the concave half mirror 12 via the lenses 11a, 11b, and 11c, and is then incident on each eyeball 16. FIG. 3A illustrates a light beam 14 as a portion of an optical path. When the illumination device 9 is stopped to turn off illumination light, and the electronic shutter 13 is set in a transmission state, an external field image is transmitted through the transparent or semi-transparent cover 3, and is incident on each eyeball 16 via the electronic shutter 13.

Figure 1:
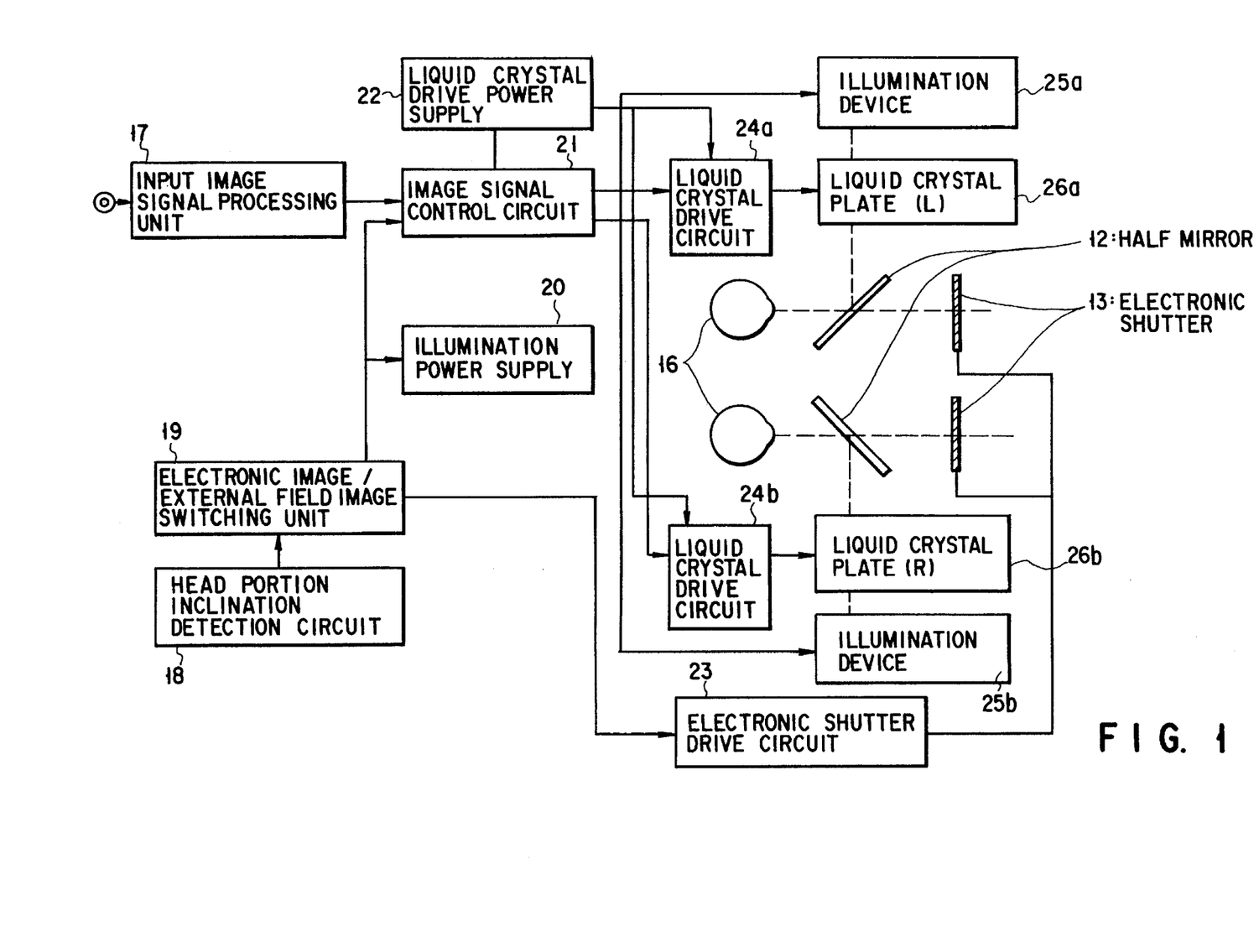
FIG. 1 is a block diagram showing a head-mount display apparatus according to the first embodiment of the present invention, and a schematic view showing its control state.

FIG. 1 is a block diagram of the head-mount display apparatus of the first embodiment, and a schematic view of its control state.

The operation of the head-mount display apparatus of this embodiment will be described below with reference to FIG. 1.

An image signal is transmitted to an input image signal processing unit 17 via the image signal cable. When a user observes an electronic image, i.e., when an electronic image/external field image switching unit 19 is set in an electronic image state on the basis of an output from a head portion inclination detection circuit 18 (corresponding to 4 in FIG. 2), an image signal control circuit 21 converts an image signal into a liquid crystal drive signal, and drives liquid crystal plates 26a and 26b (corresponding to 10 in FIG. 3A) via liquid crystal drive circuits 24a and 24b, thereby displaying two-dimensional images on the liquid crystal plates 26a and 26b.

Furthermore, the images on the liquid crystal plates 26a and 26b are illuminated with white light beams from illumination devices 25a and 25b (corresponding to 9 in FIG. 3A) driven by an illumination power supply 20, and are converted into transmission images. These transmission images are reflected by the concave half mirrors 12 via the lenses 11a, 11b, and 11c (FIG. 3A), and are projected onto the retinas of the eyeballs 16. At this time, since the electronic shutters 13 are in a shielding state, and shield external light, the concave half mirrors 12 reflect only light beams from the liquid crystal plates.

A light beam as a portion of an optical paths of the transmission light is denoted by 14 in FIG. 3A. In this manner, the images on the liquid crystal plates are projected onto the eyeballs.

When a user who wears the display apparatus 1 turns his or her head downward, the head portion inclination detection circuit 18 assembled in the apparatus main body detects a forward inclination, and when the output from the circuit 18 exceeds a predetermined inclination, the electronic image/external field image switching unit 19 outputs a control signal for an external field image.

In response to this control signal, the image signal control circuit 21 stops supply of the image signal to the liquid crystal drive circuits 24a and 24b, and also stops the illumination power supply 20. Thus, illumination light and images from the liquid crystal plates 26a and 26b are no longer incident on the eyeballs.

At the same time, an electronic shutter drive circuit 23 is turned off in response to the control signal from the electronic image/external field image switching unit 19, and an external field image is incident via the electronic shutters 13. The external field image is incident on the eyeballs 16 via the electronic shutters 13 and the concave half mirrors 12. Thus, a user can see the external field image independently of an electronic image signal or without being disturbed by the electronic image.

Figure 4:
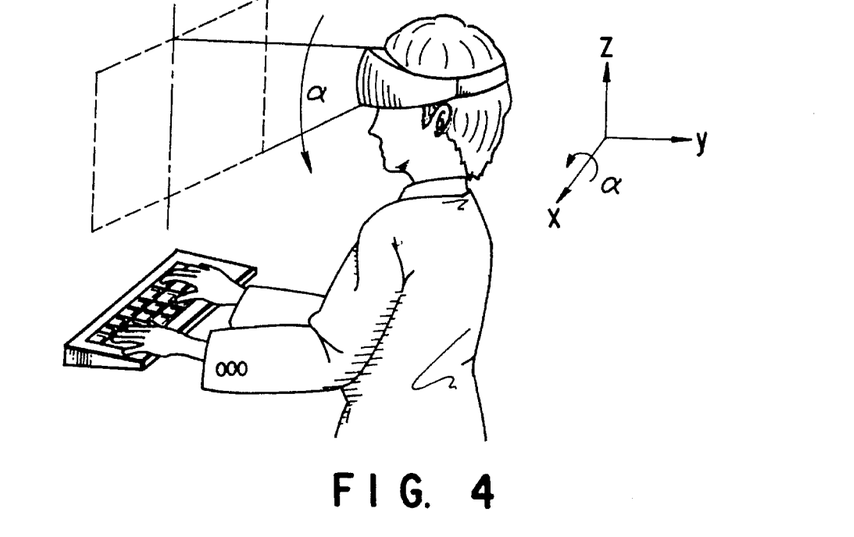
FIG. 4 is a view showing a state wherein a user can perform a switching operation between an electronic image and an external field image by moving his or her head without using his or her hand.

FIG. 4 shows a state wherein a user of the head-mount display apparatus can perform a switching operation between an electronic image on a virtual display apparatus, and an external field image when he or she performs an operation with his or her hand using a keyboard on a desk by a movement (inclination a) of his or her head without using a hand.

As described above, according to this embodiment, when a user of the head-mount display apparatus performs an operation with his or her hand on a desk, wants to see an environment around the hand, or wants to see a condition at his or her feet in a standing position, he or she can easily perform a switching operation from an electronic image to an external field image by only moving (inclining) his or her head without using a hand.

As the head portion inclination detection circuit 18, a gyro, an FOG (fiber type gyro), or the like may be used.

As the electronic shutter 13, a PLZT shutter may be similarly used in place of the liquid crystal shutter.

The apparatus of this embodiment has an auto/manual selection button (not shown). When a user wants to concentrate on an electronic image or wants to always see an external field image, an automatic switching function can be disabled using the auto/manual selection button, and the current state (electronic image/external field image) can be held.

As described above, according to the head-mount display apparatus of the first embodiment, the inclination sensor for determining a switching operation between an external field image and an electronic image is arranged, and the control apparatus for turning on/off the drive circuits of the two-dimensional display devices in accordance with the signal from the inclination sensor, and for synchronously turning the electronic shutters in a shielding/transmitting state so as to shield/transmit external light is added.

More specifically, when an electronic image is to be observed, the drive circuits are turned on, and the electronic shutters are turned in a shielding state. As a result, a user can satisfactorily see an electronic image without being influenced by any disturbance light. When an external field image is to be observed, the drive circuits are turned off, and the electronic shutters are turned in a transmitting state. As a result, a user can observe only the external field image via the electronic shutters without being disturbed by the electronic image.

The second embodiment of the present invention will be described below with reference to FIGS. 5A to 9.

Figure 5A:
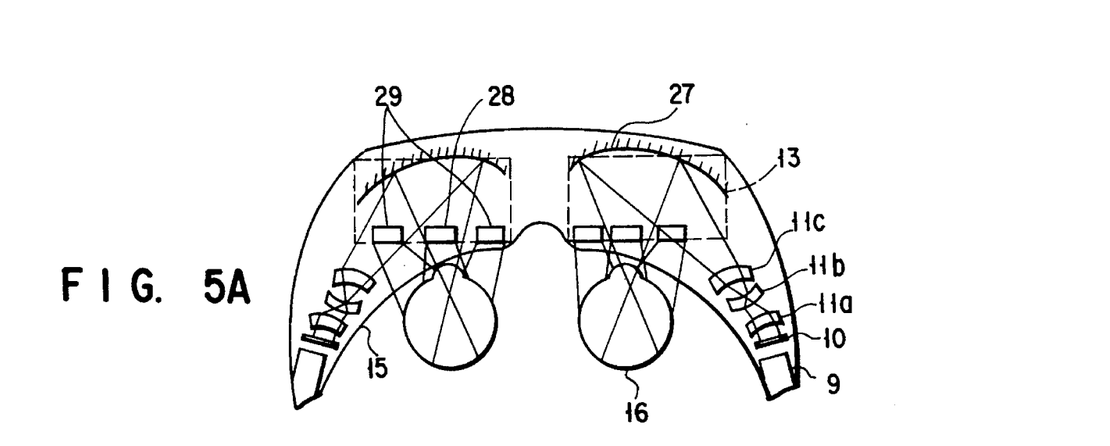
FIGS. 5A and 5B are respectively a schematic plan view and a schematic side view of a display apparatus including an optical system according to the second embodiment.
Figure 5B:
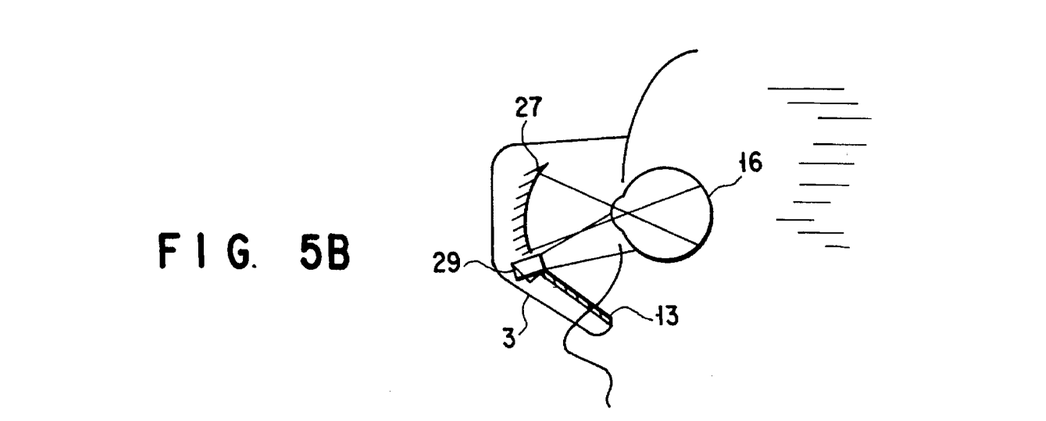

The basic arrangement of this embodiment is the same as that of the first embodiment. In the first embodiment, the concave half mirrors 12 are used. In this embodiment, as shown in FIGS. 5A and 5B, concave mirrors 27 are used. The electronic shutters 13 for transmitting an external field image are arranged under the concave mirrors 27, i.e., at positions corresponding to downward visual axes. The transparent or semi-transparent cover is arranged in front of the electronic shutters.

A visual axis detection sensor is arranged between the concave mirror 27 and the electronic shutter 13.

Figure 6A:
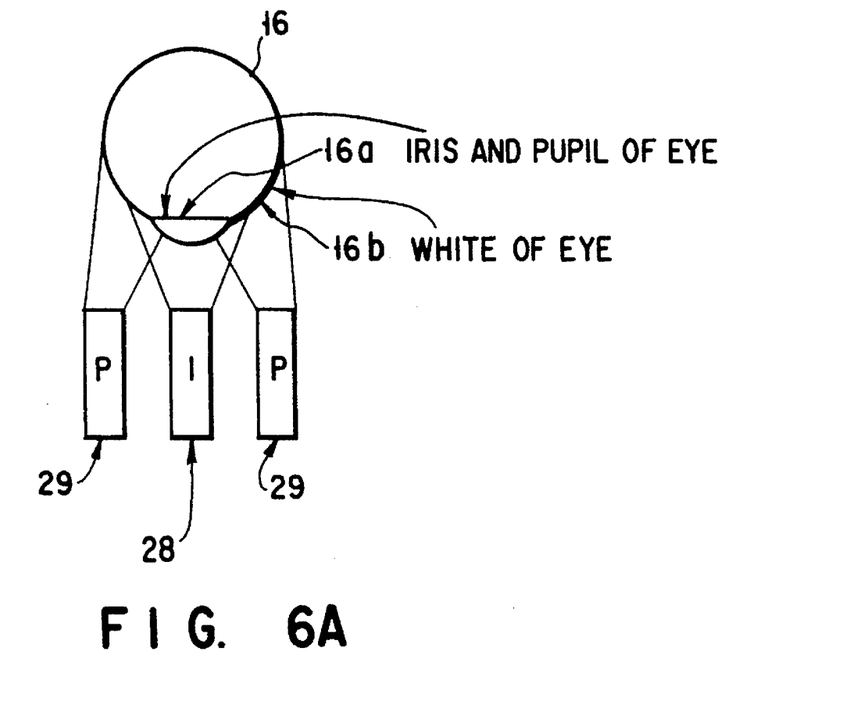
FIGS. 6A, 6B, and 6C are views for explaining an operation of a visual axis detection sensor.

FIG. 6A shows the principle of operation of such a visual axis detection sensor.

This method utilizes the fact that the iris (the iris and pupil of an eye) has a lower reflectance than that of the sclera (the white of the eye), and a boundary therebetween can be relatively easily detected. The two side portions, in the horizontal direction, of the iris ring portion (the boundary portion between the iris and the sclera) are illuminated by a light-emitting element 28 as a light source in a spot or stripe pattern. Light beams reflected by the boundary portions are received by two light-receiving elements 29, and a horizontal eyeball, moving amount (rotational angle) is detected from a difference signal between the two outputs from the light-receiving elements 29.

Figure 6B:
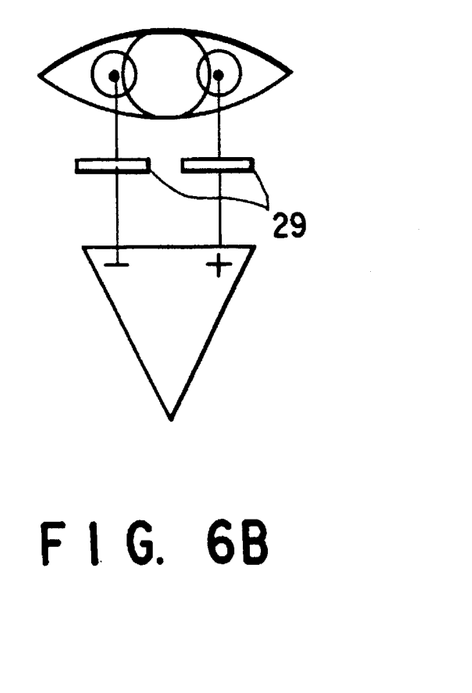
Figure 6C:
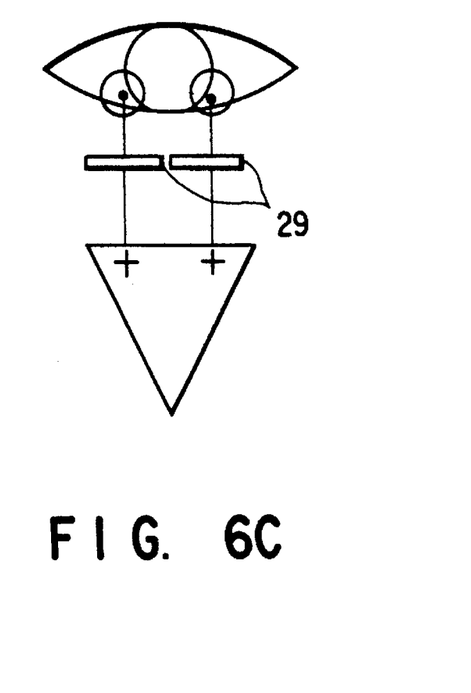

More specifically, as shown in FIG. 6B, the right-and-left direction of the visual axis is determined based on a difference between the areas of sclera portions at two sides of the iris. As shown in FIG. 6C, the eyeball moving amount in the up-and-down direction is detected based on the sum signal of the outputs from the two light-receiving elements 29. In this case, the up-and-down direction is determined on the basis of the area of the sclera portion between the iris and the lower eyelid.

Note that the light-emitting element 28 comprises an infrared light-emitting diode, and the light-receiving elements 29 comprises infrared photodiodes, thus avoiding a physical disorder to the eyes of man.

Figure 9:
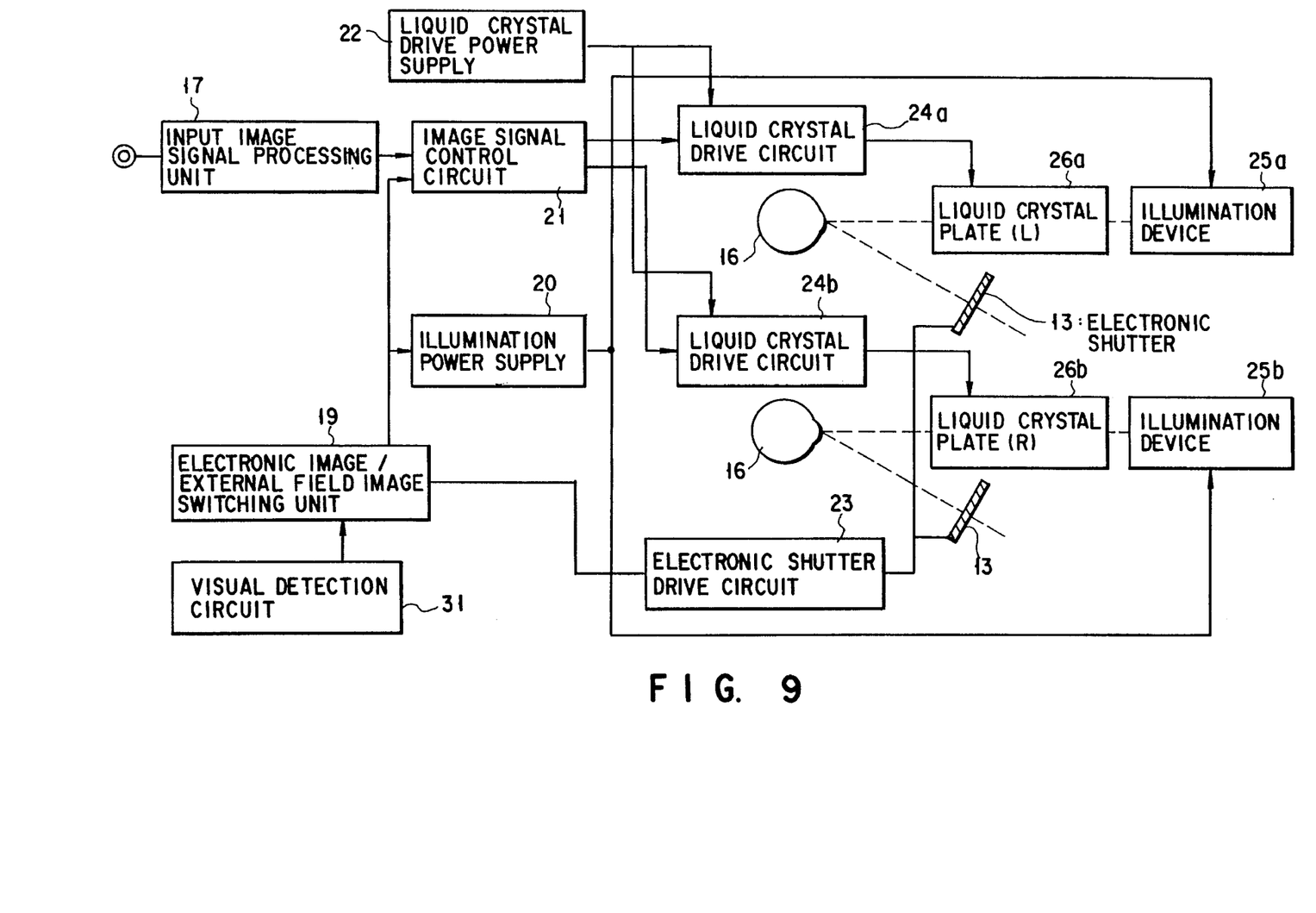
FIG. 9 is a block diagram showing a head-mount display apparatus according to the second embodiment of the present invention, and a schematic view showing its control state.

FIG. 9 is a block diagram of the head-mount display apparatus of the second embodiment, and a schematic view showing its control state. The arrangement and operation of this embodiment are substantially the same as those in the first embodiment, and only a different operation will be described below.

When a user observes an electronic image, i.e., when an output from a visual axis detection circuit 31 indicates an electronic image state, two-dimensional images are displayed on the liquid crystal plates 26a and 26b. At this time, an electronic image is reflected by the concave mirrors 27 (FIGS. 5A and 5B) regardless of the shielding/transmitting the electronic shutters 13, and is projected onto the retinas of the eyeballs. However, in this case, since the electronic shutters 13 are in a shielding state, the displayed images can be prevented from being disturbed by external light.

when a user turns his or her visual axis downward, the visual axis detection circuit 31 assembled in the apparatus main body detects the downward visual axis of the eyeballs. When the detection output from the detection circuit 31 exceeds a predetermined level, the electronic image/external field image switching unit 19 outputs a control signal for an external field image. Since the image signal control circuit 21 is stopped in response to this control signal, no further images are incident on the eyeballs.

At the same time, the electronic shutters 13 arranged in the visual axis direction are turned in a transmitting state, and an external field image can be observed via the electronic shutters 13. In this embodiment, when an external field image is to be observed, the image signal control circuit 21 need not be stopped.

Figure 7A:
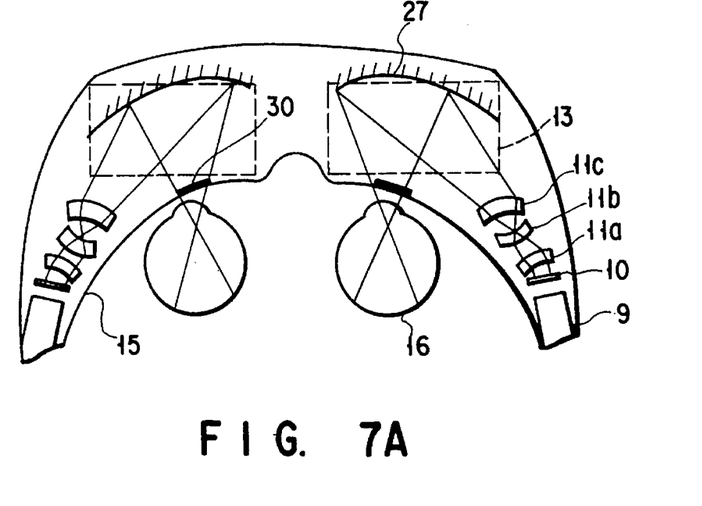
FIGS. 7A and 7B are respectively a schematic plan view and a schematic side view of a display apparatus when the visual axis is detected based on eye potentials.
Figure 7B:
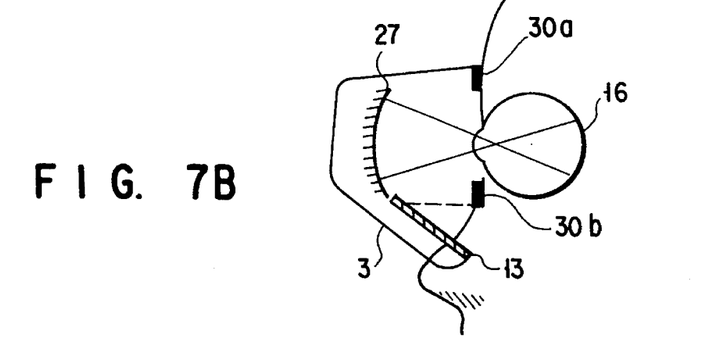
Figure 8:
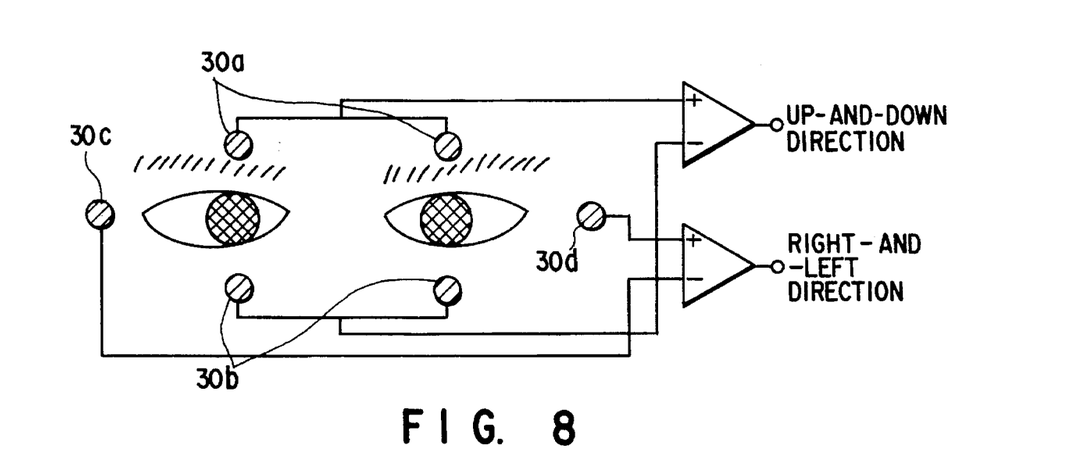
FIG. 8 is a view showing the principle of an electrooculography (EOG) method.

FIGS. 7A to 8 show a method of detecting the visual axis based on an eye potential.

FIG. 8 shows the principle of an etectrooculography (EOG) method. In this method, electrodes 30a to 30d are attached to the upper, lower, right, and left positions of the eyes on the face, and the motions of eyeballs are detected based on a change in electrode potential caused by the eyeball motions.

when a user wears the head-mount display apparatus, as shown in FIGS. 7A and 7B, the electrodes 30a and 30b are arranged at the four upper and lower positions of the two eyes on the face, and the up-and-down position of the visual axis is determined by calculating a difference signal between the upper and lower electrode signals.

As a visual axis detection method, a method utilizing a Purkinje image, a method for executing image processing of the iris, and the like are available, and arrangements utilizing these methods can also be used.

Like in the first embodiment, the apparatus of the second embodiment has an auto/manual selection button (not shown). When a user wants to concentrate on an electronic image or wants to always see an external field image, an automatic switching function can be disabled using the auto/manual selection button, and the current state (electronic image/external field image) can be held.

The effect of the second embodiment is the same as that of the first embodiment. However, in view of an operation, the visual axis can be moved quicker than the head, and an external field image can be observed without stopping an electronic image. Therefore, since a quicker switching operation than in the first embodiment can be done, operability can be further improved.

The third embodiment of the present invention will be described below.

Figure 10:
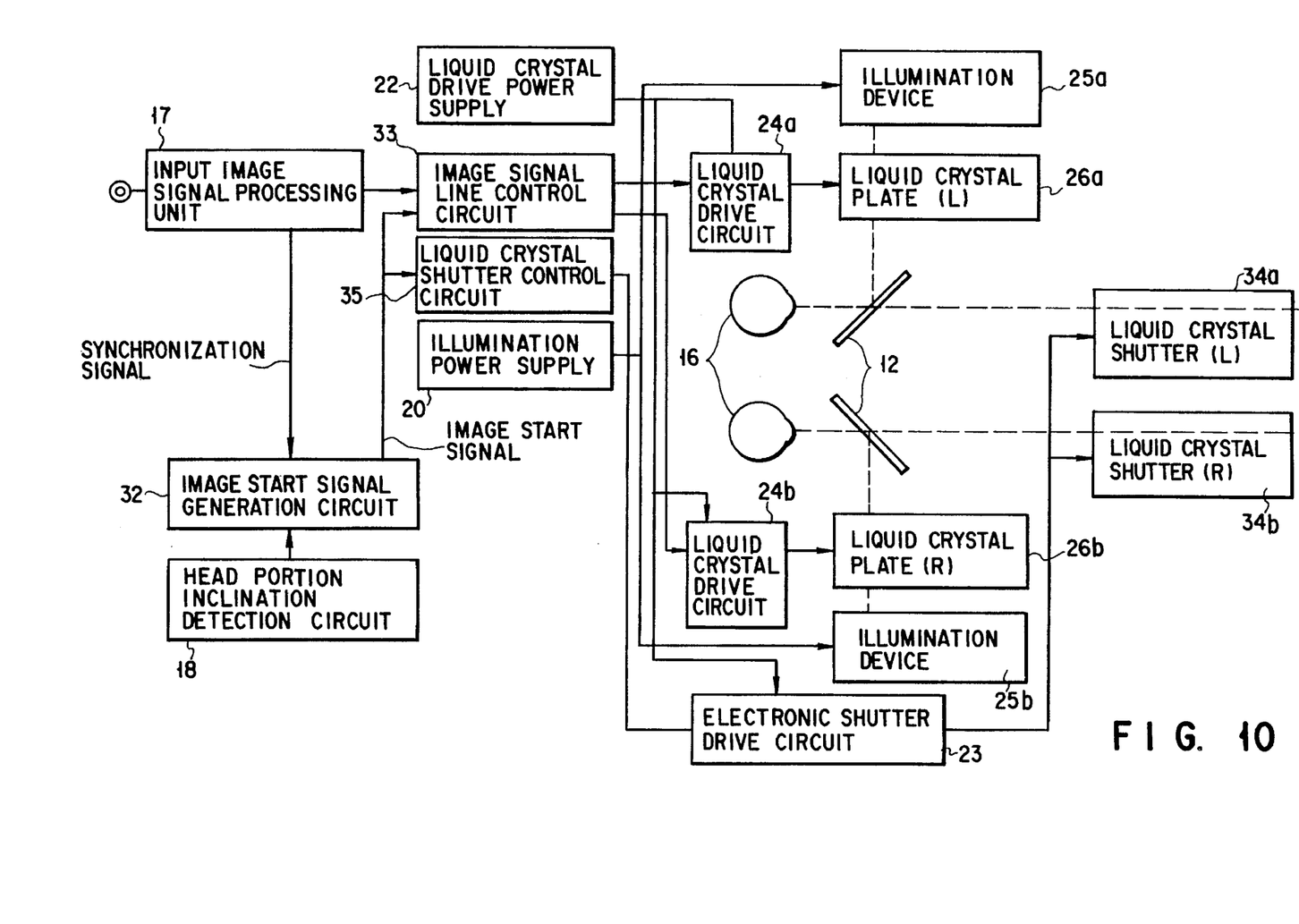
FIG. 10 is a block diagram showing a head-mount display apparatus according to the third embodiment of the present invention, and a schematic view showing its control state.

In the third embodiment, the arrangement of the head-mount display apparatus 1 is substantially the same as that in the first embodiment. FIG. 10 shows a control circuit of the third embodiment. Major differences from the first embodiment will be described below.

When a user who wears the head-mount display apparatus 1 turns his or her head downward, the head portion inclination detection circuit 18 assembled in the apparatus main body detects the forward inclination amount. An image start signal generation circuit 32 outputs an image start signal to change the time duration of a vertical synchronization signal output from the input image signal processing circuit 17. The image start signal generation circuit 32 has a function of delaying the output timing of the image start signal as the output from the head portion inclination detection circuit 18 indicates a larger forward inclination of the head. The image start signal is output in synchronism with a horizontal synchronization signal.

An image signal line control circuit 33 supplies an image signal to the liquid crystal drive circuits 24a and 24b on the basis of the image start signal. More specifically, since an image signal generated when the image start signal is generated is supplied to the liquid crystal drive circuits 24a and 24b, image generation is started from the middle of the image signal, and an input image is displayed from its middle portion. No image signal is present in a short line portion after the scanning end line, and no image signal is displayed on the lower portion of the screen.

At the same time, a liquid crystal shutter control circuit 35 operates in synchronism with the image signal line control circuit 33. The control circuit 35 turns in a shielding state liquid crystal shutters 34a and 34b in a horizontal line direction at a generation timing of the image signal after the image start signal is generated, and turns in a transmitting state the liquid crystal shutters 34a and 34b corresponding to a horizontal line signal at a timing of no image signal.

Therefore, at a timing when no image signal is supplied, and the liquid crystal shutters 34a and 34b are turned in a transmitting state, an external image is incident from lower portions of the liquid crystal shutters 34a and 34b. At this time, each of the liquid crystal shutters 34a and 34b is a liquid crystal plate, which is constituted by arranging stripe-shaped transparent electrodes elongated at least in the horizontal direction in correspondence with several scanning lines, and has a shutter function capable of dividing the screen in the up-and-down direction at an arbitrary position.

Therefore, an external field image is incident on the eyeballs 16 via the lower portions of the liquid crystal shutters 34a and 34b, and the lower portions of the concave half mirrors 12. The portions for transmitting the external field image change in accordance with the signal level of the head portion inclination detection circuit 18, and are widened upward from the lower portion of the screen as the inclination amount is increased.

Figure 11A:
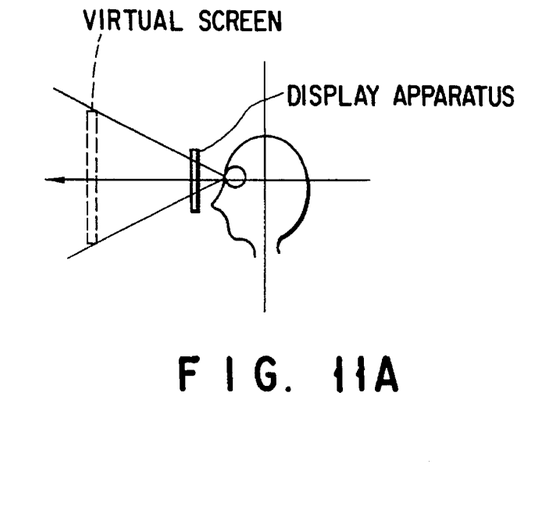
FIGS. 11A, 11B, and 11C are views for explaining the way an electronic image is seen in accordance with the inclination of a head.
Figure 11B:
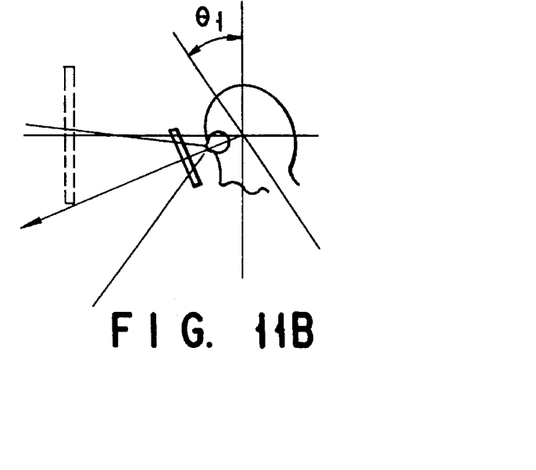
Figure 11C:
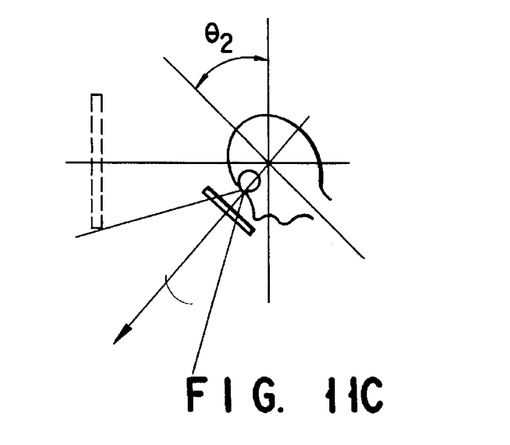
Figure 12A:
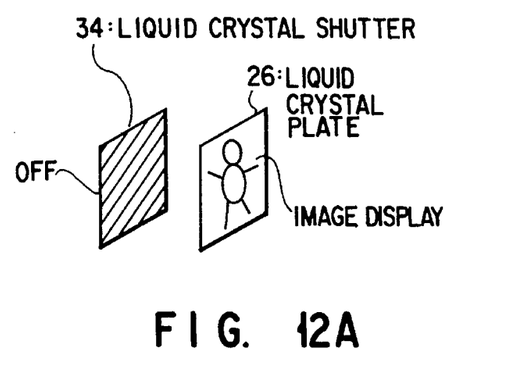
FIGS. 12A, 12B, and 12C are views showing the relationships between a liquid crystal screen and a liquid crystal shutter at different inclination angles of the head.
Figure 12B:
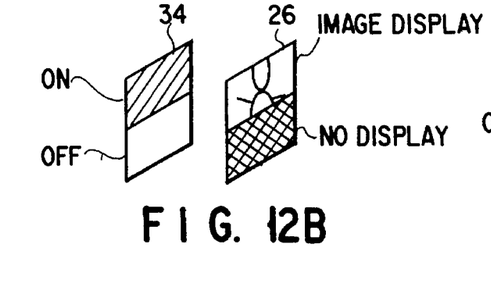
Figure 12C:
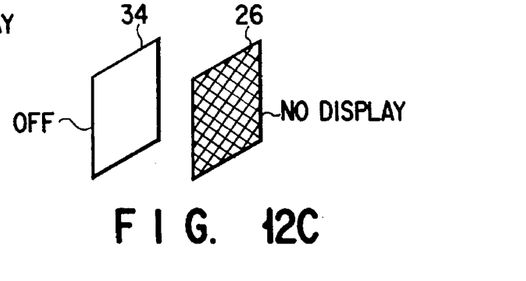

FIGS. 11A to 11C show the way an electronic image is seen in accordance with the inclination of the head. FIGS. 12A to 12C show the relationships between the liquid crystal screen and the liquid crystal shutter 34 at the corresponding inclination angles. FIGS. 11A and 12A show a virtual screen image when the head is held at the vertical position, and the relationship between the liquid crystal screen and the liquid crystal shutter 34 at that time. FIGS. 11B and 12B, and FIGS. 11C and 12C show states wherein the inclination of the head is increased.

The scanning start line number of an electronic image signal is proportional to the output from the head portion inclination detection circuit 18, and the start line number is increased as the inclination amount of the head portion becomes larger. Therefore, an electric image is displayed as if it were fixed at a predetermined level position from the floor surface, regardless of the inclination of the head.

On the other hand, the observable range of an electronic image itself is narrowed. As an inclination detector, a gyro, an FOG (fiber type gyro), or the like may be used. The apparatus of this embodiment has an auto/manual selection button (not shown) when a user wants to concentrate on an electronic image or wants to always see an external field image, an automatic switching function can be disabled using the auto/manual selection button, and the current state (electronic image/external field image) can be held.

The effect of the third embodiment is the same as that of the first embodiment. However, in view of an operation, since an electronic image is fixed in a predetermined space when the head is moved, or since a portion of an electronic image is always displayed, the screen position space can be easily recognized. Thus, an observation switching operation between an electronic image and an external field image can be more naturally performed. Since no quick switching operation is required unlike in the first and second embodiments, a more natural operation can be performed.

The fourth embodiment of the present invention will be described below. In this embodiment, optical path synthesizing means such as a half mirror is arranged between a concave mirror of a head-mount display apparatus and the eye of a user. Upon operation of the optical path synthesizing means, an image from a two-dimensional display element, and light from a visual axis or blink detector can be simultaneously guided toward the visual axis direction of a user, and the detector can be arranged at the dead angle position of the eye. A light projection system and a light-receiving system of the detector can be arranged as a coaxial system, thus making a detection system compact.

Furthermore, if display light from an image on the two-dimensional display element is guided to be incident on the optical path synthesizing means at least twice to prolong the image projection optical path, the apparatus can be rendered compact. If infrared rays are used as a detection light source, and an infrared ray transmission filter is arranged between the detector and the optical path synthesizing means, the detector can be invisible to the naked eye.

More specifically, a head-mount display apparatus of this embodiment, which includes a two-dimensional display element for displaying an image, and an optical system for projecting the image on the two-dimensional display element onto eyeballs in a main body having a shape, which can be mounted on and held by a head portion, comprises a visual axis or blink detector, and optical path synthesizing means for synthesizing an optical path for projecting the image, and an optical path of projected light from the visual axis or blink detector, wherein the image and the projected light synthesized by the optical path synthesizing means are guided to the eyeballs.

In this case, display light from an image on the two-dimensional display element can be guided to be incident on the optical path synthesizing means at least twice. The visual axis or blink detector can use infrared rays as a detection light source, and an infrared ray transmission filter can be arranged in the optical path of the projected light between the visual axis or blink detector and the optical path synthesizing means.

The fourth embodiment will be described in detail below with reference to the accompanying drawings. In this embodiment, a half mirror is used as the optical path synthesizing means, and infrared rays are used as the detection light source for the visual axis or blink detector.

Figure 13:
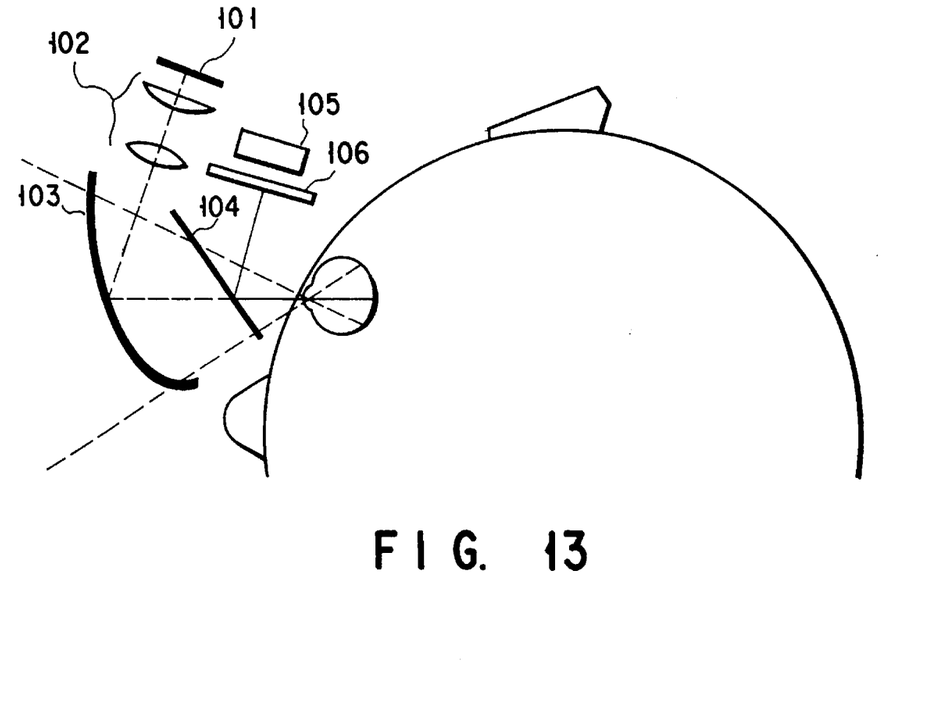
FIG. 13 is a schematic view showing a head-mount display apparatus according to the fourth embodiment of the present invention.
Figure 14:
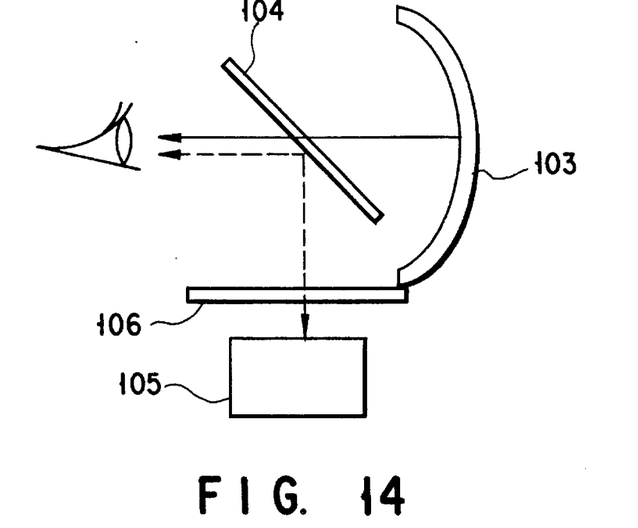
FIG. 14 is a view showing an arrangement of a portion in front of an eye according to the fourth embodiment.
Figure 15:
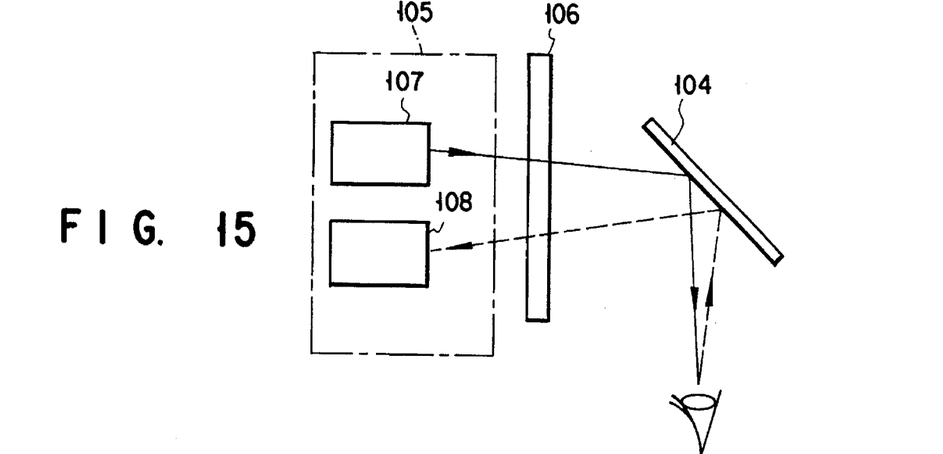
FIG. 15 is an explanatory view of a visual axis or blink detection unit according to the present invention.

FIG. 13 is a schematic view showing an arrangement of a head-mount display apparatus of this embodiment, FIG. 14 shows an arrangement in front of the eye, and FIG. 15 is an explanatory view of a detection unit. The display apparatus has a two-dimensional display element 101, having an illumination light source, for displaying an input image signal, an optical system 102 for projecting an image on the display element, and a concave mirror 103 for deflecting the projection optical path toward a corresponding eyeball, and projecting an image in an enlarged scale. In addition to the optical systems 102 and 103, a half mirror 104 is arranged between the eye of a user and the concave mirror 103, and a blink detection unit 105 is arranged at a position on the incident side of the half mirror 104 and aside the corresponding eye.

As indicated by a solid line in FIG. 14, an image from the two-dimensional display element 101 reflected by the concave mirror 103 is transmitted through the half mirror 104, and is guided to the eye. On the other hand, the blink detection unit 105 is arranged at the dead angle position of a user. Infrared light (indicated by a dotted line in FIG. 14) projected from the blink detection unit 105 is transmitted through an infrared ray transmission filter 106, is reflected by the half mirror 104, and is then guided to the eye. The infrared light reflected by the eye returns to the detection unit 105 along the same path in the opposite direction. The infrared light is received by the detection unit 105, and the light-receiving amount is processed, thus detecting a blink.

In this manner, since infrared light from the blink detection unit 105 can be incident from the central axis direction of the field of view, and reflected light in the central axis direction can be detected, blink detection performance can be improved. As shown in FIG. 15, since a light projection unit 107 and a light-receiving unit 108 of the blink detection unit 105 can be arranged adjacent to each other, the detection unit 105 can be integrated and rendered compact. The image of the eye is fetched by the light-receiving unit 108 using lenses and an image sensor, and is subjected to image processing, thus detecting a blink and a visual axis (motion of the eyeball).

when the inclination direction of the half mirror 104 is changed, the arrangement direction of the detection unit 105 can be changed. Since the infrared ray transmission filter 106 is arranged, the detection unit 105 arranged in front of the half mirror 104 cannot be recognized by a user.

Figure 16:
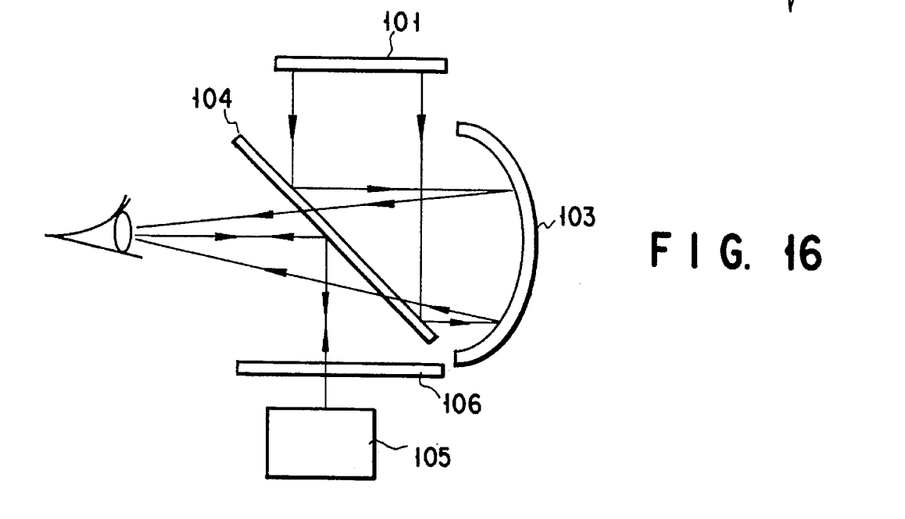
FIG. 16 is a schematic view showing an arrangement which commonly uses a half mirror to an image system and a detection system according to the fifth embodiment of the present invention.

The fifth embodiment of the present invention will be described below with reference to FIG. 16. In this embodiment, as shown in FIG. 16, display light from an image displayed on the two-dimensional display element 101 is temporarily reflected by the half mirror 104, and is incident on the concave mirror 103. The display light is reflected by the concave mirror 103, and is incident on the half mirror 104 again. Then, light transmitted through the half mirror 104 is guided to the eye of a user. On the other hand, infrared light projected from the blink detection unit 105 arranged at the dead angle position of a user is transmitted through the infrared ray transmission filter 106, is reflected by the half mirror 104, and is projected onto the eye of a user. The infrared light reflected by the eye is received by the detection unit 105 along the incident optical path in the opposite direction. When the light-receiving amount is processed, a blink can be detected.

Note that display light from the two-dimensional display element 101, which light is transmitted through the half mirror 104, and is guided toward the detection unit 105, is absorbed by the infrared ray transmission filter 106, and is not guided toward the eye.

With this arrangement, an optical system including image projection optical systems 102 and 103, and an optical system of the blink detection unit 105 can be rendered compact, and the blink detection unit 105 can be arranged at the dead angle position of the eye so as not to influence a displayed image.

Figure 17:
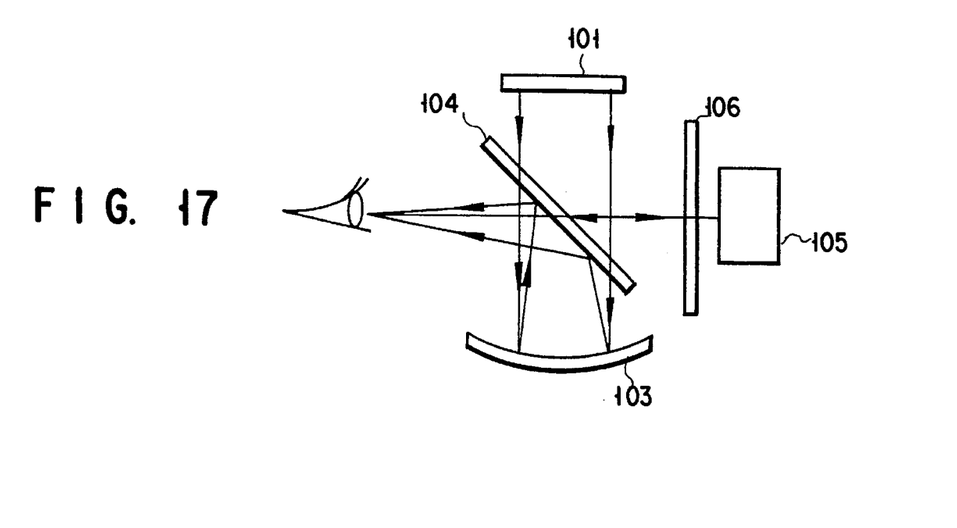
FIG. 17 is a schematic view showing a modification of FIG. 16.

As shown in FIG. 17, the same function can be provided even when the positions of the concave mirror 103, the detection unit 105, and the infrared ray transmission filter 106 are replaced.

In the fourth and fifth embodiments, a half mirror is used as the optical path synthesizing means, and infrared rays are used as the detection light source for the visual axis or blink detector. In the fourth embodiment, a dichroic mirror for transmitting visible rays and reflecting infrared rays is preferably used in place of the half mirror since the light amount loss is small. Furthermore, image display light may be S-polarized light, projected light from the detector may be P-polarized light, and a polarization beam splitter may be used in place of the half mirror to synthesize optical paths.

The optical path synthesizing means need not always be arranged just in front of the eyeball. For example, the same effect can be obtained even when the optical path synthesizing means is arranged at any position between the two-dimensional display element 101 and the concave mirror 103 in FIG. 13.

When it does not matter if projected light is visible, the same effect can be obtained even if light other than infrared rays is used as a detection light source for the visual axis or blink detector in the fourth and fifth embodiments.

The head-mount display apparatus of the present invention has been described with reference to its embodiments. However, the present invention is not limited to these embodiments, and various modifications may be made.

As described above, in the first to third embodiments of the present invention, when a user who wears the head-mount display apparatus wants to operate while observing an external field image at his or her hand, he or she need not perform a switching operation between an electronic image and an external field image, and operability with the apparatus can be further improved.

As can be apparent from the above description, according to the fourth and fifth embodiments of the present invention, since the display apparatus comprises the visual axis or blink detector, and the optical path synthesizing means for synthesizing an optical path for projecting an image on the two-dimensional display element, and an optical path for projected light from the visual axis or blink detector, and guides the image and the projected light synthesized by the optical path synthesizing means to the eyeball, a light projection system and a light-receiving system of the detector arranged at the dead angle position of the eye can be arranged as a coaxial system in the visual axis direction without influencing the field of view in an image display state. Therefore, the apparatus can be integrated and rendered compact.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A display apparatus, which can be mounted on a head portion of a person using the display apparatus, the display apparatus comprising:

first and second two-dimensional display units arranged at positions which are away from a field of vision of right and left eyeballs of a user, for displaying images corresponding to the right and left eyeballs of the user respectively;

first and second image enlargement and projection optical systems for optically enlarging the images displayed on said first and second two-dimensional display units;

a shutter unit, arranged in front of the eyeball of the user;

an inclination detector for detecting at least a forward inclination of motions of the head portion of the user;

control means for controlling said shutter unit in accordance with an output signal from said inclination detector, and for switching said shutter unit between a light transmission state when the user inclines the head portion forward, and a light-shielding state when the user does not incline the head portion forward;

first and second semi-transparent reflection units, arranged between said shutter unit and said right and left eyeballs, for overlapping in a certain region the first and second images enlarged by said image enlargement and projection optical systems and an external image transmitted through said shutter unit and for projecting said first and second images and said external images onto retinas of said right and left eyeballs; and a housing, which encloses and holds all of said first and second two-dimensional display units, said first and second enlargement and projection optical systems, said shutter unit, said first and second semi-transparent reflection units and said inclination detector, and wherein said housing mountable on the head portion of the user and wherein said housing is arranged to prevent light other than light transmitted through said shutter means from being incident on the eyeballs of the user.

2. An apparatus according to claim 1, wherein:

light from said first and second two-dimensional display units is reflected by said first and second semi-transparent reflection units and reaches the eyeballs of the user; and light transmitted through said shutter unit is transmitted through said first and second semi-transparent reflection units and reaches the eyeballs of the user.

3. An apparatus according to claim 1 wherein:

said first and second semi-transparent reflection units each have a shape of concave mirror; and the light transmitted through said shutter unit is reflected by said first and second semi-transparent reflection units and reaches the eyeballs of the user.

4. A display apparatus, which can be mounted on a head portion of a person using the display apparatus, the display apparatus comprising:

first and second two-dimensional display units, arranged at positions away from a field of vision of right and left eyeballs of a user, for displaying images corresponding to the right and left eyeballs of the user, respectively;

image enlargement and projection optical systems for optically enlarging the images displayed on said first and second two-dimensional display units;

a shutter unit, arranged in front of the eyeball of the user;

an inclination detector for detecting at least a downward motion of a visual axis direction of the user;

control means for controlling said shutter unit in accordance with an output signal from said inclination detector, and for switching said shutter unit between a light transmission state when the user inclines the head portion downward, and a light-shielding state when the user does not incline the head portion downward;

first and second semi-transparent reflection units, arranged between said shutter unit and said right and left eyeballs, for overlapping in a certain region the first and second images enlarged by said image enlargement and projection optical systems and an external image transmitted through said shutter unit and for projecting said first and second images and said external images onto retinas of said right and left eyeballs; and a housing, which encloses and holds all of said first and second two-dimensional display units, said first and second image enlargement and projection systems, said shutter unit, said first and second semi-transparent reflection units and said inclination detector, and wherein said housing is mountable on the head portion of the user and wherein said housing is arranged to prevent light other than light transmitted through said shutter unit from being incident on the eyeballs of the user.

5. A display apparatus according to claim 4, wherein:

said inclination detector projects light onto the eyeballs of the user, and detects at least one of a visual axis direction of the eyeballs of the user and a blink of the eyes of the user upon reception of light reflected by the eyeballs of the user; and said display apparatus further comprises optical path synthesizing means for synthesizing an optical path of said image enlargement and projection optical systems, and an optical path of light projected form said inclination detector onto the eyeballs of the user.

6. An apparatus according to claim 5 wherein:

said optical path synthesizing comprises a half mirror arranged in front of the eyeballs of the user;

said first and second semi-transparent reflection units have a shape of a concave mirror;

light from said first and second two-dimensional display units is reflected by said half mirror, is reflected by said semi-transparent reflection means having a shape of concave mirror, is transmitted through said half mirror, and reaches the eyeballs of the user; and light projected from said inclination detector is reflected by said half mirror and reaches the eyeballs of the user.

7. An apparatus according to claim 6, wherein:

the light projected from said inclination detector onto the eyeballs of the user includes infrared light; and said optical path synthesizing means includes a dichroic mirror.

8. An apparatus according to claim 6, wherein:

the light projected from said inclination detector onto the eyeballs of the user includes infrared light; and the apparatus further comprises a filter for transmitting the infrared light and for shielding visible light, said filter being arranged in an optical path between said inclination detector and said optical path synthesizing means.

9. A display apparatus according to claim 5, wherein:

said optical path synthesizing means includes a half mirror arranged in front of the eyeballs of the user;

said display apparatus further comprises a concave mirror arranged above or below said optical path synthesizing means;

light from said two-dimensional display units is transmitted through said half mirror, is reflected by said concave mirror, is reflected by said half mirror, and reaches the eyeballs of the user; and light projected from said inclination detector is transmitted through said half mirror, and reaches the eyeballs of the user.

10. An apparatus according to claim 9, wherein:

the light projected from said inclination detector onto the eyeballs of the user includes infrared light; and said optical path synthesizing means includes a dichroic mirror.

11. An apparatus according to claim 9, wherein:

the light projected from said inclination detector onto the eyeballs of the user includes infrared light; and the apparatus further comprises a filter for transmitting the infrared light and for shielding visible light, said filter being arranged in an optical path between said inclination detector and said optical path synthesizing means.

12. An apparatus according to claim 5, wherein:

the light projected from said inclination detector onto the eyeballs of the user includes infrared light; and said optical path synthesizing means includes a dichroic mirror.

13. An apparatus according to claim 5, wherein:

the light projected from said inclination detector onto the eyeballs of the user includes infrared light; and the apparatus further comprises a filter for transmitting the infrared light and for shielding visible light, said filter being arranged in an optical path between said inclination detector and said optical path synchronizing means.

14. An apparatus according to claim 4 wherein:

said first and second semi-transparent reflection units each have a shape of concave mirror; and the light transmitted through said shutter unit is reflected by said first and second semi-transparent reflection units and reaches the eyeballs of the user.

15. A display apparatus, which can be mounted on a head portion of a person using the display apparatus, the display apparatus comprising:

a two-dimensional display unit for displaying an image;

a projection optical system for projecting the image displayed on said two-dimensional display unit onto a retina of an eyeball of a user;

a shutter unit, arranged in front of the eyeball of the user, for switching an arbitrary region between a light-transmission state and a light-shielding state;

an inclination detector for detecting at least a forward inclination of motions of the head portion of the user and for outputting a detection signal;

image signal control means for delaying a scan start line number of an image signal supplied to said two-dimensional display unit, in proportion to the detection signal which is outputted from said inclination detector;

shutter control means, operating in synchronism with the image signal control means, for controlling said shutter unit to be in said light-shielding sate during a time period between a scan start time and a scan end time of said image signal control means, and in said light-transmission state during other time periods; and a housing, which encloses and holds all of said two-dimensional display unit, said projection optical system, said shutter unit, and said inclination detector, and wherein said housing is mountable on the head portion of the user.

16. An apparatus according to claim 15, wherein said shutter unit comprises a liquid-crystal shutter.

17. An apparatus according to claim 15, wherein said projection optical system comprises a concave mirror.

\* \* \* \* \*